United States Patent [19]
Crawford et al.

[11] Patent Number: 6,094,290
[45] Date of Patent: Jul. 25, 2000

[54] LIGHT-REACTIVE THERMAL WINDOW

[76] Inventors: Christopher L. Crawford; Cheryl Lynn Crawford, both of 1162 W Bridge, Plainwell, Mich. 49080

[21] Appl. No.: 09/296,301

[22] Filed: Apr. 22, 1999

[51] Int. Cl.$^7$ .................. G02F 1/03; G02F 1/01
[52] U.S. Cl. .................. 359/241; 359/265; 359/267; 359/272; 359/275; 359/288; 359/513; 359/601; 428/620
[58] Field of Search .................. 359/241, 243, 359/265, 267, 269, 270, 273, 272, 275, 450, 512, 513, 601, 609, 611, 894; 428/620

[56] References Cited

U.S. PATENT DOCUMENTS

| | | | |
|---|---|---|---|
| 3,964,823 | 6/1976 | Trozzolo | 359/241 |
| 4,608,349 | 8/1986 | Kerko et al. | 501/13 |
| 4,832,468 | 5/1989 | Ito et al. | 359/275 |
| 4,892,394 | 1/1990 | Bidabad | 359/275 |
| 4,938,571 | 7/1990 | Cogan et al. | 359/275 |
| 5,124,833 | 6/1992 | Barton et al. | 359/269 |
| 5,128,799 | 7/1992 | Byker | 359/265 |
| 5,239,406 | 8/1993 | Lynam | 359/275 |
| 5,282,077 | 1/1994 | Byker | 359/272 |
| 5,390,045 | 2/1995 | Bernard, Jr. | 359/275 |
| 5,481,395 | 1/1996 | Byker | 359/272 |
| 5,525,430 | 6/1996 | Chahroudi | 428/620 |
| 5,587,828 | 12/1996 | Bernard, Jr. | 359/275 |
| 5,598,293 | 1/1997 | Green | 359/275 |
| 5,680,245 | 10/1997 | Lynam | 359/265 |
| 5,751,467 | 5/1998 | Byker | 359/272 |
| 5,781,343 | 7/1998 | Cook | 359/608 |
| 5,790,298 | 8/1998 | Tonar | 359/267 |
| 5,801,873 | 9/1998 | Byker | 359/272 |

FOREIGN PATENT DOCUMENTS

| | | |
|---|---|---|
| 55-67729 | 5/1980 | Japan . |
| 58-80624 | 5/1983 | Japan . |
| 58-184129 | 10/1983 | Japan . |

*Primary Examiner*—Loha Ben
*Attorney, Agent, or Firm*—Richard C. Litman

[57] ABSTRACT

A light-reactive thermal window is disclosed having external and internal panes. The external pane is composed of photochromic glass, while the internal pane is composed of clear glass. The panes are separated by a space having a uniform thickness. Each of the panes has a peripheral edge, with a spacer located between the peripheral edges of the external and internal panes. A sealant seals the peripheral edges of the external and internal panes. The window may include a frame securing together the spacer, the sealant, and the peripheral edges of the panes. Also disclosed is a method of preventing glare on a screen while minimizing climate control costs by installing a light-reactive thermal window near the screen.

18 Claims, 2 Drawing Sheets

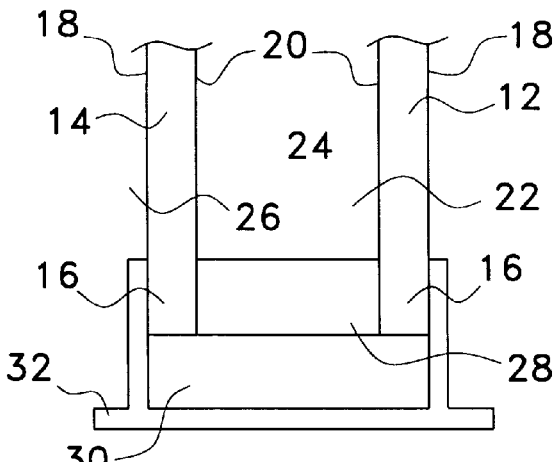
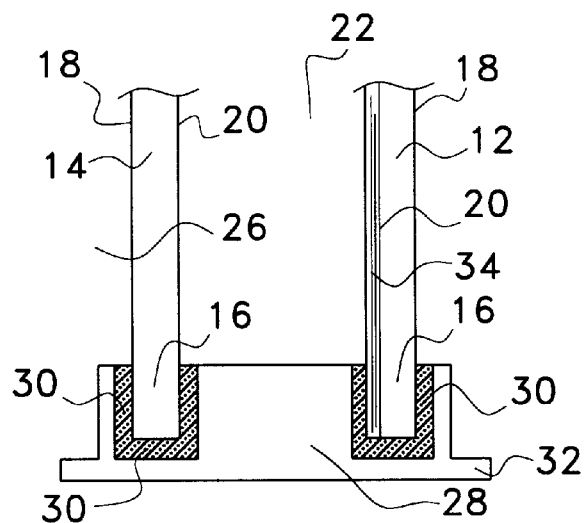
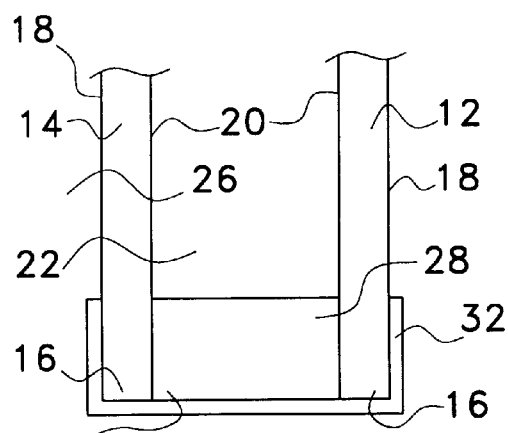

LIGHT-REACTIVE THERMAL WINDOW

BACKGROUND OF THE INVENTION

1. Field of the Invention

The present invention relates to windows.

2. Description of the Related Art

Natural light is generally preferable to artificial light for lighting workspaces and homes during the day. The spectrum of natural light has a warm, pleasant quality. Plentiful natural light helps a room to feel larger and less confined, and enhances the mood of people working or relaxing in the room. Natural light has the disadvantage of being variable and sometimes unpredictable. On a warm day, sunlight pouring in through a window can quickly overheat a room. The amount of light entering a room can be controlled with curtains and blinds. However, these have to be manually adjusted when the light level changes. Closed shades, curtains, and blinds also obscure the view through the window.

Too much light entering through a window also causes glare. Glare is a particular problem with screens, such as television screens and computer screens. Glare makes the contents of the screen hard to see, and can lead to eyestrain and fatigue. The larger the screen, the more of a problem glare is. Big-screen televisions, including projection televisions, are particularly prone to annoying glare problems.

Curtains, blinds, and the like often allow small amounts of light to pass through them, even when completely closed. For example, light may leak around the edges of a shade or between the slats of a blind. This light can cause annoying lines of glare on a screen.

Anti-glare covers for computer screens are available to control the problem of glare. The cover is located between the user's eyes and the screen and can itself interfere with the user's view of the screen.

Windows suited for use in homes and other buildings are available in a wide variety of shapes, sizes, and glass types. Thermal windows having multiple panes of glass separated by a sealed space are well known. The most common type contains two panes of glass and is referred to as a double-glazed or double-pane window. The panes are ordinarily separated by a space of about $3/16$ to $5/8$ inch. The space reduces heat loss. Typical thermal window panes are made of clear glass. The space may be filled with air or another gas, such as carbon dioxide, argon, or krypton.

It is known to use low-emissivity or low-E glass in thermal windows. Low-E glass has a thin, clear coating of a metal oxide. The coating allows most of the visible light to pass through, but is a barrier to longer infrared and near-infrared wavelengths. In winter, sunlight passes through to warm the surfaces in a room, but the heat which re-radiates is blocked from escaping. In summer, low-E glass blocks heat radiated from outdoor surfaces from entering the house. Low-E glass also partially blocks ultraviolet or UV radiation.

The use of tinting to limit visible light passing through a window is well known. Common types are gray-tinted and bronz-tinted windows. Tinted windows block light regardless of the weather conditions. A tint dark enough to control glare on a bright, sunny day is likely to be unpleasantly dark on cloudy days or when the sun is low in the sky.

Photochromic glass which darkens in response to light is well known. Photochromic glass is frequently used as lens material for eyeglasses and sunglasses. A photochromic lens material is commercially available under the trademark "PHOTOGRAY EXTRA" from Corning Glass Works. The most common types of photochromic materials change color when the incident radiation causes a lower-energy form of a photochromic molecule to change into a higher-energy form with a different absorption spectrum.

U.S. Pat. No. 3,964,823 to Trozzolo discloses articles employing photochromic materials and is incorporated by reference. The photochromic materials include mono- and bicyclic aziridines and bi- and tri-cyclic oxirane compounds in crystalline form. The photochromic materials function by selective absorption depending on the polarization of the incident radiation. This is particularly effective in selectively reducing reflected or glare light. The articles include windshields, glass panes, and sunglasses.

U.S. Pat. No. 4,608,349 to Kerko et al. disclose photochromic glass compositions and is incorporated by reference. The photochromic glass compositions are stated to be suitable for thin, refractive-index-corrected lightweight lenses.

U.S. Pat. No. 5,390,045 to Bernard, Jr. teaches a selectively variable window tinting system for limiting the passage of visible light and radiative heat through an automobile window. In a first embodiment, the system includes automobile glass made of a photochromic glass which darkens on exposure to sunlight. In a second embodiment, the system has a pair of glass panes. A tinted fluid can be pumped in and out between the panes. Two or more fluids can be used so that the degree of tint can be changed. The system is stated to be suitable for house windows.

None of the above inventions and patents, taken either singularly or in combination, is seen to describe the instant invention as claimed. Thus a light-reactive thermal window solving the aforementioned problems is desired.

SUMMARY OF THE INVENTION

The present invention is a light-reactive thermal window. The window includes external and internal panes. The external pane is composed of photochromic glass, while the internal pane is composed of clear glass. The panes are separated by a space having a uniform thickness. Each of the panes has a peripheral edge, with a spacer located between the peripheral edges of the external and internal panes. A sealant seals the peripheral edges of the external and internal panes. The window may include a frame securing together the spacer, the sealant, and the peripheral edges of the panes. The invention also includes a method of preventing glare on a screen while minimizing climate control costs by installing a light-reactive thermal window near the screen.

Accordingly, it is a principal object of the invention to provide a thermal window having an external pane of photochromic glass, an internal pane of clear glass, and a sealed space separating the panes.

Still another object of the invention is to provide a thermal window having a single photometric pane which darkens in response to bright light.

It is another object of the invention to prevent glare on screens, including television and computer screens.

It is a further object of the invention to minimize air conditioning and heating costs.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a fragmented, cross-sectional view of the peripheral edge of a window, drawn along line 2—2 of FIG. 1.

FIG. 3 is a fragmented, cross-sectional view of the peripheral edge of a window including low-E glass.

FIG. 4 is a fragmented, cross-sectional view of the peripheral edge of an alternative window.

Similar reference characters denote corresponding features consistently throughout the attached drawings.

DETAILED DESCRIPTION OF THE PREFERRED EMBODIMENTS

Figure 1:
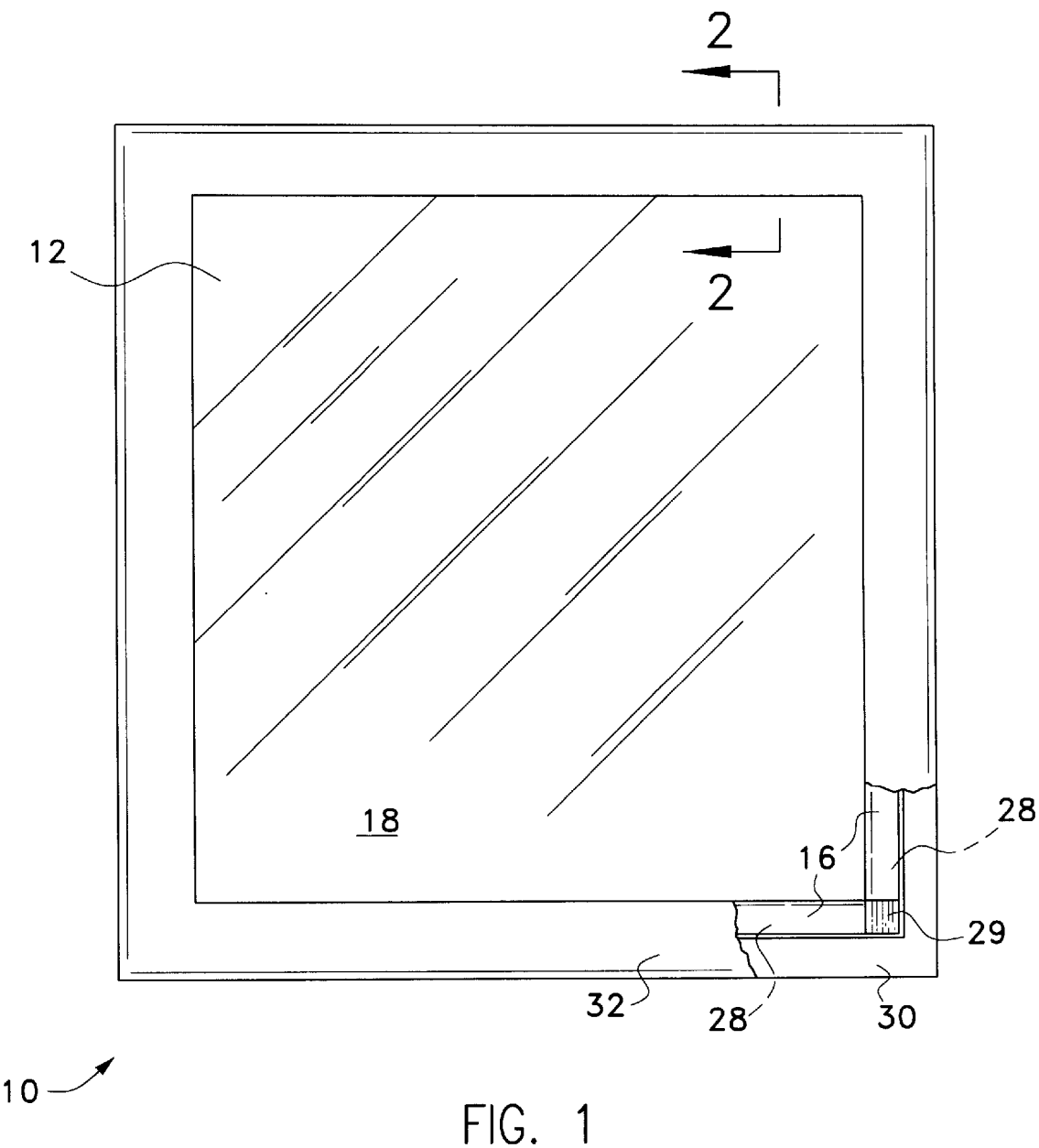
FIG. 1 is a fragmented, front view of a light-reactive thermal window according to the present invention.

The present invention is a light-reactive thermal window 10 having an external pane 12 and an internal pane 14. Each pane 12 or 14 has a peripheral edge 16, an outer surface 18, and an inner surface 20. The peripheral edge 16 extends completely around each pane. The external pane 12 is composed of photochromic glass, while the internal pane 14 is composed of clear glass. A space 22 separates the external and internal panes.

Any type of photochromic glass may be used for the external pane 12. Photochromic glass changes color from clear to dark when exposed to bright light, such as sunlight. The passage of light in the visible wavelengths is greatly reduced when the glass is dark. In the dark or in dim light, photochromic glass changes color from dark to clear. This allows the maximum amount of light to pass through when the incident light is limited. The depth of color of the external pane is generally proportional to the amount of light falling on it. The thickness of the photochromic glass is preferably at least 1/16 inch (2 mm).

A large variety of photochromic glasses are disclosed in U.S Pat. Nos. 3,964,823 and 4,608,349, previously incorporated by reference. Due to the amount of glass required for a typical window, an inexpensive photochromic glass is preferred for the invention. The photochromic glass of the thermal window 10 does not require rapid color changes. A relatively complete color change from clear to dark within 10 minutes is preferred, but 15 minutes is adequate. For a relatively complete fading from dark to clear, an elapsed time of 15 minutes is preferred, and 20 minutes is acceptable. Suitable photochromic glasses are commercially available.

Gray is preferred as the dark color of the photochromic glass. Gray has less effect on colors seen through the window and on the quality of the light entering the window. However, brown, blue, green, or other colors may be used.

Conventional window glass is suitable for the internal pane. The thickness of the internal pane is preferably about 1/8 inch or 3 mm.

The space 22 between the external and internal panes 12 and 14 has a uniform or generally uniform thickness. See FIGS. 2–4. A thickness of 3/16 to 5/8 inch is preferred, most preferably about 1/4 inch or 6 mm. The space 22 is preferably filled with argon or another inert gas, but may be filled with air. The inner surface 20 of each of the external and internal panes 12 and 14 is adjacent to the space 22. The outer surface 18 of the external pane 12 contacts the external environment 24. The external pane 12 is therefore oriented towards the exterior of the building in which the window 10 is installed. See FIG. 2. The outer surface 20 of the internal pane 14 contacts the internal environment 26, typically the interior of a room. This arrangement is important for optimal glare reduction and energy efficiency.

A spacer 28 is preferably located between the peripheral edge 16 of the external pane 12 and the peripheral edge 16 of the internal pane 14. See FIG. 2. The thickness of the space 22 is determined by the width of the spacer 28.

Suitable spacers are well known for use in double-glazed windows. Vinyl and steel are acceptable as spacers. Butyl rubber may be used if a flexible spacer is desired. Preferably the spacer 28 is composed or substantially composed of aluminum. Aluminum is inexpensive and easy to assemble between the panes. Aluminum strips or aluminum tubing may be used as the spacer. If desired, a nylon corner 29 may be used to join sections of aluminum tubing, as shown in FIG. 1. Only a single nylon corner 29 is shown; however, it is typical of the other three corners.

A sealant 30 seals the space 22 and prevents the escape of the gas filling the space 22. See FIGS. 2–4. The sealant 30 is located at the peripheral edges 16 of the external and internal panes 12 and 14. Any sealant capable of forming a durable, airtight seal to glass may be used. Suitable sealants are well known for use in double-glazed windows. Polycarbonate or P.R.C. is suitable as a sealant. Another suitable sealant is butyl rubber. A layer of butyl rubber between the peripheral edges of the panes may serve as both the spacer and the sealant, if desired. See FIG. 4.

The thermal window 10 may include a frame 32. The frame 32 secures together the spacer, the sealant, and the peripheral edges of the external and internal panes. The frame makes the window easier to install and more versatile. Any known frame configuration may be used in the present invention. The window may be a fixed-pane, casement, double-hung, single-hung, or sliding window. Suitable materials for the frame include aluminum, steel, wood, vinyl-clad wood, and vinyl. In FIG. 1 a portion of the frame 32 has been omitted to show the peripheral edge 16 of the external pane. The spacer 28 and the sealant 30 are visible through the external pane 12.

FIGS. 2, 3, and 4 are cross-sectional views of alternative arrangements of the spacer, sealant, and frame. The spacer 28 may be integrally connected to the frame 32, as shown in FIG. 3. The spacer and the sealant may be integrally connected, as in FIG. 4 The sealant 30 may be a block of material, as in FIG. 2. The sealant may also be formed in a U-shape around the peripheral edge 16 of each pane, as in FIG. 3.

EXAMPLE

A thermal window is assembled by first cutting aluminum spacers to the desired size. The spacers are bent as needed in a tubing bender. The spacers are assembled using an air drier and corners to hold them together. The inside surfaces of both panes of glass are washed. The external pane is laid with the clean side up. The assembled spacers are laid on the clean side of the external pane. The internal pane is then laid on top of the spacers, with the clean side down. All of the peripheral edges are then sealed with a sealant.

The light-reactive thermal window has several advantages over ordinary clear double-glazed windows. Whenever the light is dim outdoors, the thermal window 10 is clear and allows the maximum amount of natural light to enter the room. When the outdoors is brightly lit, the thermal window 10 darkens to prevent the entry of too much light into the room. This prevents glare and overheating, smoothing out much of the variability in the daytime light level. No complicated electrical systems or fluid pumping systems are necessary to adjust the tint of the glass.

Since the color change occurs automatically when the light level changes, there is no need to close or open curtains or adjust blinds. Glare cannot leak around the edges, as with a curtain or a blind. Annoying glare lines on screens are avoided. If sunlight touches one corner of the window, the affected section of the window darkens to control the spot of glare. The rest of the window, which may be in shadow, can remain clear. This allows the maximum visibility through the window while controlling glare. Even when the entire window changes to its dark color, it is still possible to see through the window; this is not true with most window coverings. The thermal window is therefore particularly useful for windows having attractive views.

The thermal window provides better glare control and is much more convenient than other glare-control methods. Glare control occurs automatically whenever it is needed, without any intervention by a person. Glare is controlled at the source of the light, rather than at the screen. The user's view of the screen is not obstructed by anti-glare devices.

The light-reactive thermal window is also energy efficient. Since the internal pane of glass is clear, heat does not build up in the space between the internal and external panes. This increases energy efficiency and prevents damage to the window. When the weather is cold, the insulating air space limits heat loss from the interior of the building. In hot weather, the thermal window functions both by limiting the amount of radiation entering through the window and by limiting heat transfer between the air-conditioned internal environment and the hot external environment.

Various coatings may be added to the panes to further improve the performance of the thermal window. Ideally the external pane 12 includes a low-emissivity coating 34, as shown in FIG. 3. The low-emissivity coating 34 is preferably located adjacent to the inner surface 20 of the external pane. The combination of the light-reactive thermal window with the low-E coating is particularly effective in hot weather. The low-E coating prevents outside heat from radiating into the building at all times. The thermal window selectively controls the entry of visible light on an as-needed basis. The combination allows large windows to be included in homes and offices in hot climates, without requiring view-obscuring curtains and blinds. Air-conditioning costs are significantly lowered.

The present invention includes a method of preventing glare on a screen while minimizing climate control costs. The first step of the method is selecting a thermal window 10. The thermal window includes an external pane 12, an internal pane 14, and a sealant. The external pane is composed of photochromic glass and the internal pane of clear glass, as described above.

The next step is selecting a window opening. The window opening is located near a screen, such as a television or computer screen. The window opening may be in a residential or a commercial building. The screen may be a cathode ray tube screen or a projection screen, such as the screen for a big-screen projection television.

The next step is installing the thermal window in the selected window opening. The outer pane 12 is installed adjacent to the external environment 24. The inner pane 14 is located adjacent to the internal environment 26.

It is to be understood that the present invention is not limited to the embodiments described above, but encompasses any and all embodiments within the scope of the following claims.

We claim:

1. A thermal window comprising:
    an external pane and an internal pane, each pane having a peripheral edge and an outer surface, the external pane being composed of photochromic glass, the internal pane being composed of clear glass, the external and internal panes being separated by a space, the space having a uniform thickness, the outer surface of the external pane being adapted to contact an external environment, the outer surface of the internal pane being adapted to contact an internal environment;
    a spacer located between the peripheral edge of the external pane and the peripheral edge of the internal pane; and
    a sealant located at the peripheral edges of the external and internal panes, the sealant sealing the space.

2. The thermal window according to claim 1, wherein the spacer is substantially composed of aluminum.

3. The thermal window according to claim 1, wherein the spacer is substantially composed of vinyl.

4. The thermal window according to claim 1, wherein the spacer and the sealant are substantially composed of butyl rubber.

5. The thermal window according to claim 1, wherein the sealant is substantially composed of polycarbonate.

6. The thermal window according to claim 1, further comprising a frame, the frame securing together the spacer, the sealant, and the peripheral edges of the external and internal panes.

7. The thermal window according to claim 6, wherein the frame is substantially composed of a material selected from the group consisting of aluminum, steel, wood, vinyl-clad wood, and vinyl.

8. The thermal window according to claim 1, wherein the external pane includes a low-emissivity coating.

9. A method of preventing glare on a screen while minimizing climate control costs, comprising the steps of:
    (a) selecting a thermal window, the thermal window comprising an external pane, an internal pane, and a sealant, the external pane being composed of photochromic glass, the internal pane being composed of clear glass, the external and internal panes each having a peripheral edge and an outer surface, the external and internal panes being separated by a space, the sealant sealing the space at the peripheral edges of the external and internal panes;
    (b) selecting a window opening, the window opening being located near a screen; and
    (b) installing the thermal window in the window opening, the outer pane being located adjacent to an external environment, the inner pane being located adjacent to an internal environment.

10. The thermal window according to claim 9, wherein the external pane includes a low-emissivity coating.

11. The method according to claim 9, wherein the screen is a cathode ray tube screen.

12. The method according to claim 9, wherein the screen is a projection television screen.

13. The method according to claim 9, wherein the sealant is polycarbonate.

14. The method according to claim 9, wherein the thermal window includes a spacer located between the peripheral edge of the external pane and the peripheral edge of the internal pane.

15. The method according to claim 14, wherein the spacer is substantially composed of a material selected from the group consisting of aluminum, steel, vinyl, and butyl rubber.

16. The method according to claim 14, wherein the spacer and the sealant are substantially composed of butyl rubber.

17. The method according to claim 14, further comprising a frame securing the spacer, the sealant, and the peripheral edges of the external and internal panes.

18. The method according to claim 17, wherein the frame is substantially composed of a material selected from the group consisting of aluminum, steel, wood, vinyl-clad wood, and vinyl.

* * * * *